United States Patent Office 3,326,822
Patented June 20, 1967

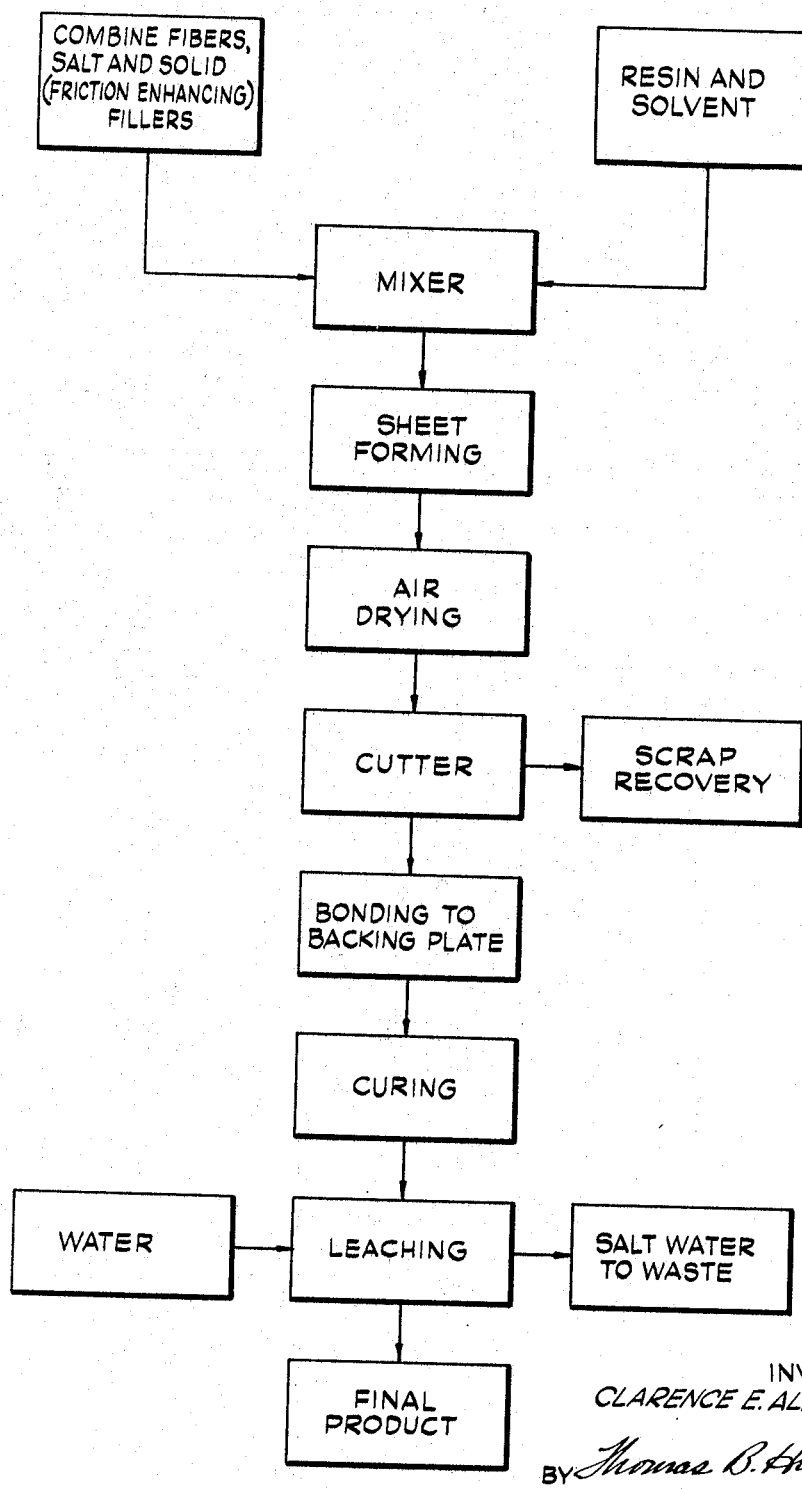

3,326,822
FRICTION ELEMENTS AND METHODS OF
THEIR MANUFACTURE
Clarence E. Albertson, Villa Park, Ill., assignor to Borg-Warner Corporation, Chicago, Ill., a corporation of Illinois
Filed Sept. 24, 1963, Ser. No. 311,226
15 Claims. (Cl. 260—2.5)

This invention relates to friction elements and methods of their manufacture, and more particularly to a method of controlling the porosity of a friction material adapted for use in a wet environment.

Torque control devices such as clutches and brakes of the type continuously operated in a bath of oil or other fluid require friction materials of a porous nature to induce saturation thereof by the oil. Since the degree of porosity in the friction material is a significant factor in assuring satisfactory operation of the torque control devices incorporating such materials, porosity control has been receiving increasing attention from manufacturers of commercial friction materials.

Unfortunately, many of the methods now used in the manufacture of these materials are not well adapted for the control of porosity and a uniform product is not easily obtained. For example, in the typical asbestos-phenolic resin friction facing, the degree of porosity is a function of several factors including the length and diameter of the asbestos fibers, the degree of agglomeration of said fibers, the physical properties and amount of the resin used, and the characteristics of the various fillers which are often added to improve the frictional qualities of such materials. In addition, the process steps such as curing temperatures, mixing and drying times, and the particular manner in which the material is molded or shaped, e.g., by rolling, pressure molding, or felting, all influence the porosity of any given composition.

It is therefore a general object of the invention to provide an improved method of manufacturing a friction material so that the porosity of said material can be closely controlled.

It is another object of the invention to provide an improved friction material prepared in accordance with the foregoing method.

It is still another object of the invention to provide an improved method of controlling the porosity of friction compositions.

Additional objects and advantages of the invention will be apparent from a reading of the following detailed description taken in conjunction with the drawing wherein the figure represents a systematic flow diagram of the processes carried out in accordance with the principles of the present invention.

Briefly described, the invention comprehends the use of a leachable or soluble pore forming filler which is added to the suspension of binder solution and solid constituents prior to the sheeting of the material and curing of the resin binder. After curing the resin binder, the composition is in the form of an interfelted, fibrous mat or base which is bonded into coherent mass to provide a tough, wear and heat-resistant friction material. At this stage, the soluble filler, unaffected by the sheeting and curing steps, is uniformly interspersed throughout the solid material. To render the material porous, the soluble filler is removed by leaching the material in a suitable solvent whereby the filler material is selectively dissolved without weakening the resinous binder. The friction material may be bonded to a reinforcing or backing plate prior to leaching the filler. In this case, the solvent must be compatible with the binder and the adhesive used to bond the material to the backing plate.

An important aspect of the invention is concerned with a method of preparing a friction material having interconnected, as distinguished from isolated, voids or pores to promote the absorption of oil deep into the interstices of the material. More specifically, the absorbing power of the friction composition is augmented by the presence of a plurality of small, interconnected voids occupying at least 35%, and preferably between about 40% and about 65%, of the volume of said material, said voids being uniformly distributed throughout said material. Unless the composition is characterized by this interconnected porosity, the oil has a tendency to remain on or near the surface of the friction interface when the clutch is engaged, thereby precluding optimum frictional performance.

In order to fully explain the principles of the invention, reference will be made to a specific example which is intended to be representative of various porous friction material formulations suitable for the aforementioned purposes. It should be understood, however, that the example is illustrative only and is not limiting on the invention in any respect.

EXAMPLE

|  | Parts by Weight | Solids by Weight | Density | Solids by Volume | Percent Volume Occupied by Solids |
|---|---|---|---|---|---|
| Chrysotile asbestos (7D-1) [1] | 7 | 7 | 2.5 | 2.8 | 19.3 |
| "Insoluble" Filler: |  |  |  |  |  |
|   Barytes | 1 | 1 | 4.5 | .22 | 1.5 |
|   Resin granules [2] | 1 | 1 | 1.3 | .77 | 5.3 |
| "Soluble" Filler: Ball milled |  |  |  |  |  |
|   NaCl [3] | 15 | [4] 15 | 2.16 | 6.95 | 47.9 |
| Binder solution [5] | 440 | [6] 4.9 | 1.3 | 3.75 | 26.0 |
|  |  |  |  |  | 100.0 |

[1] Canadian Scale.
[2] Cashew nut shell resin granules known as "Collan 10A".
[3] Approximately 100 mesh.
[4] Subsequently removed by leaching.
[5] Comprising, by weight: 2 parts varnish-type phenolic resin solution (50% solids) and 3 parts solvent (⅓ ethyl alcohol and ⅔ xylene).
[6] Assumes that the resin pick-up (resin solids retained) is approximately 35%, by weight of the end product.

The dry ingredients listed in table were combined and blended with the binder solution to provide a relatively thin suspension with the solids uniformly dispersed throughout the liquid phase. The "insoluble" fillers listed in the table constitute conventional friction enhancing materials which augment the friction characteristics of the facings in actual operation. These materials are insoluble in the particular solvent employed to leach the pore forming material.

In the particular example, a sheet or mat was formed by felting the suspension onto the permeable face plate of a vacuum filter, the laboratory equivalent of a Fourdrinier machine or similar apparatus which could be used in full-scale production. It should be understood, however, that any other well-known sheet forming process could be utilized. For example, by increasing the relative proportion of solids in the suspension to provide a pasty or dough-like mixture, sheets may be formed by rolling or calendering the material into a sheet having a relatively uniform thickness.

Referring back to the example, the sheet material formed on the liquid permeable, vacuum filter element was air dried to evaporate substantially all of the solvent retained in the material. Thereafter, a plurality of annular discs were cut from the material and the discs were secured to reinforcing or backing plates of the type used in a multiple disc friction clutch. The discs were joined to steel backing plates by priming both faces of each backing plate with a suitable adhesive and then applying the discs thereto. The composite assembly was then placed in a curing oven and cured at 350° F. under approximately 2,000 p.s.i. pressure.

After removal from the curing oven, the assemblies were immersed in hot water to leach out the salt particles which were distributed uniformly throughout the facing material. Several changes of water were made until the water was noted to be completely free of salt.

Subsequent tests of the friction material indicated that it contained approximately 30 to 40 percent resin, the resin percentage being a function of the vacuum applied during the felting step. The porosity was established as being approximately 50 percent voids by volume, which corresponds very closely to the theoretical value in the example.

It should be apparent from the foregoing example that numerous soluble filler-solvent combinations may be used in the formulation. For example, suitable soluble fillers include inorganic salts such as sodium chloride and sodium sulfate and soluble organic materials such as sugars and starches. As a matter of fact, any filler-solvent combination can be used which does not corrode the base plate, or weaken the adhesive and the bonding resin. For various reasons, water is probably the most suitable solvent although diluted acids and bases, as well as some organic solvent such as alcohols, esters, ethers, and aromatics may be used if the aforementioned conditions are met. By imposing a close control on the particle size of the material to be leached from the friction composition, the size of the individual pores and the overall porosity may be controlled within narrow limits. The specific volume of voids, is, of course, affected by the proportion of soluble filler used and the individual pore size is a function of the particle size of said fillers.

Experiments with various soluble fillers having different particle sizes and densities have shown that fillers having a particle size significantly larger than about 50 mesh require more filler (with respect to the volume occupied) to obtain the necessary interconnected condition of the voids. In other words, whereas satisfactory materials having interconnected porosity in the range of 40% to 65% by volume can be made using a filler of approximately 50 mesh or finer, the interconnected condition is not obtained until sufficient filler is added to effect 70 to 80 percent voids using filler materials larger than 50 mesh. Porosity in this higher range generally produces weak linings which tend to tear in heavy duty service.

While the invention has been described in connection with a specific example, it is contemplated that various fibrous materials, both organic and inorganic, may be used with substantially the same results, and the invention does not necessarily depend for its utility on the particular fiber, binder, or the filler ingredients. Many modifications will occur to those skilled in the art so that the invention is defined solely by the appended claims, which should be construed as broadly as the prior art will permit.

What is claimed is:
1. A method of making a porous composition suitable for wet clutch facings comprising the steps of:
  providing a suspension of asbestos fibers and friction enhancing solid fillers in a binder, said binder including a thermosetting resin;
  adding a soluble particulate pore forming material to said suspension;
  forming the solid phase of said suspension into a sheet;
  drying said sheet;
  curing the binder to provide an interfelted fibrous base impregnated with said cured binder; and
  leaching the solid particulate material therefrom with a selective solvent for said pore forming material.
2. A method as defined in claim 1 wherein said friction enhancing solid fillers are selected from the group consisting of barytes and cashew nut shell resin.
3. A method as defined in claim 1 wherein said resin comprises a varnish-type phenolic resin.
4. A method as defined in claim 1 wherein said soluble particulate pore forming material consists of a water-soluble, inorganic salt.
5. A method as defined in claim 1 wherein said particulate pore forming material has a particle size not in excess of about 50 mesh.
6. A product made in accordance with the method defined in claim 1.
7. A method of controlling the porosity of a porous friction composition of the type including a mixture of a fibrous material, a friction enhancing solid filler and an uncured thermosetting resinous binder including the steps of:
  providing a sheet comprising an interfelted fiber mat having a friction enhancing solid filler therein saturated with an uncured thermosetting resin and a water soluble particulate pore forming material uniformly interspersed throughout said base;
  curing said binder; and
  thereafter leaching the water soluble particulate pore forming material from said composition by immersing said material in a solvent which is capable of selectively dissolving said pore forming material.
8. A method as defined in claim 7 where in said fibrous material comprises asbestos fiber.
9. A method as defined in claim 8 wherein said friction enhancing solid fillers are selected from the group consisting of barytes and cashew nut shell resin.
10. A method as defined in claim 8 wherein said resin comprises a varnish-type phenolic resin.
11. A method as defined in claim 8 wherein said soluble particulate pore forming material consists of a water-soluble, inorganic salt.
12. A method as defined in claim 8 wherein said particulate pore forming material has a particle size not in excess of about 50 mesh.
13. A method of manufacturing a porous wet clutch friction material comprising the steps of:
  providing a mixture including, by weight, approximately 7 parts asbestos, 2 parts of a water insoluble friction enhancing filler, 15 parts of a water soluble pore forming filler having a specific gravity of approximately 2.1 and 440 parts of a resinous binder solution thereby providing a suspension of the above-identified solid materials in said binder solution;

forming said solid materials into an interfelted mat saturated with said binder solution;
drying said mat to evaporate the excess solvent;
curing the resin binder thereby transforming said composition into a coherent mass; and
leaching the water soluble pore forming filler from said composition to provide a composition having interconnected voids occupying approximately 40 to 65 percent of the volume of said composition.

14. A method as defined in claim 13 wherein said water soluble pore forming filler is selected from the group consisting of sodium chloride, sodium sulphate, sugar and soluble starch.

15. A method as defined in claim 14 wherein the particle size of said water soluble pore forming filler is not in excess of about 50 mesh.

References Cited

UNITED STATES PATENTS

| | | | |
|---|---|---|---|
| 1,321,897 | 11/1919 | De France | 264—273 |
| 1,980,227 | 12/1933 | Repony. | |
| 2,054,210 | 9/1936 | Weisenburg | 264—273 XR |
| 2,182,774 | 5/1937 | Birmbaum | 106—36 |
| 2,773,286 | 12/1956 | Pricard et al. | 264—49 |
| 2,913,772 | 11/1959 | Buchkremer et al. | 264—49 |
| 3,048,888 | 8/1962 | Shockley et al. | 264—49 XR |
| 3,062,760 | 11/1962 | Dermody et al. | 264—49 |
| 3,131,076 | 4/1964 | Richardson et al. | 264—49 XR |

ALEXANDER H. BRODMERKEL, *Primary Examiner.*

P. E. ANDERSON, *Assistant Examiner.*